United States Patent [19]

Bernhardt et al.

[11] Patent Number: 4,798,421

[45] Date of Patent: Jan. 17, 1989

[54] PLUNGER SYSTEM FOR MODULATING A BRAKE PRESSURE

[75] Inventors: Wolfgang Bernhardt, Korntal; Michael Tischer, Abstatt, both of Fed. Rep. of Germany

[73] Assignee: Robert Bosch GmbH, Stuttgart, Fed. Rep. of Germany

[21] Appl. No.: 106,831

[22] Filed: Oct. 13, 1987

[30] Foreign Application Priority Data

Nov. 14, 1986 [DE] Fed. Rep. of Germany ....... 3638980

[51] Int. Cl.⁴ .............................................. B60T 8/42
[52] U.S. Cl. .................................... 303/115; 303/60; 303/71; 303/110; 303/113
[58] Field of Search ................ 303/115, 10, 116, 113, 303/117, 54, 61, 60, 71, 110, 119; 188/181 A

[56] References Cited

U.S. PATENT DOCUMENTS

| | | | |
|---|---|---|---|
| 3,466,098 | 9/1969 | Pieren et al. | 303/117 |
| 3,871,716 | 3/1975 | Skoyles | 188/181 A |
| 3,907,376 | 9/1975 | Drutchas | 303/116 |
| 4,068,904 | 1/1978 | Blomberg et al. | 303/115 |
| 4,627,670 | 12/1986 | Madsuda et al. | 303/115 |
| 4,648,663 | 3/1987 | Nomura et al. | 303/119 |
| 4,685,749 | 8/1987 | Otsuki et al. | 303/119 |
| 4,714,300 | 12/1987 | Heess et al. | 303/115 |
| 4,721,345 | 1/1988 | Nishimura et al. | 303/115 |

FOREIGN PATENT DOCUMENTS 2212912 9/1973 Fed. Rep. of Germany .

Primary Examiner—Andres Kashnikow
Assistant Examiner—Mark T. Le
Attorney, Agent, or Firm—Edwin E. Greigg

[57] ABSTRACT

A plunger system in a brake line between a master brake cylinder and a wheel brake cylinder of a vehicle, for modulating a brake pressure in the event of a sensor-detected danger of wheel locking or wheel spinning. The plunger system has a plunger that is axially displaceable in a housing. At one end, the plunger engages a variable pressure chamber toward the master brake cylinder and at the other it engages a variable pressure chamber toward the wheel brake cylinder. It has an axial bore, through which a rod passes, between the two pressure chambers, and this bore can be closed on opposite ends if there is a danger of wheel locking or if wheel spinning occurs. The closure of the axial bore is effected by an axial motion of the plunger, which takes place if the wheels lock, on the one hand, and if they spin, on the other.

23 Claims, 1 Drawing Sheet

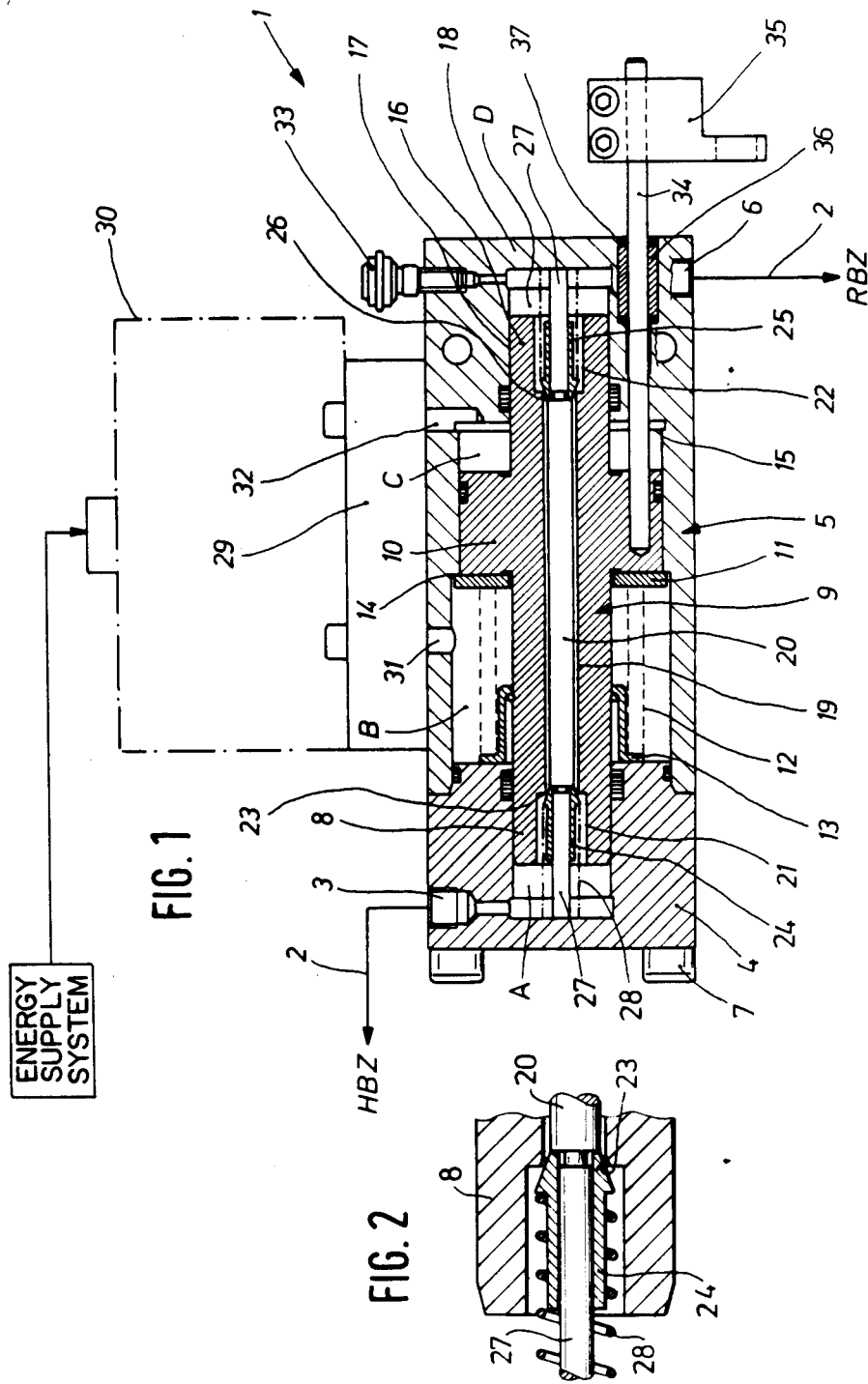

PLUNGER SYSTEM FOR MODULATING A BRAKE PRESSURE

BACKGROUND OF THE INVENTION

The invention is based on a plunger system in a brake line between a master brake cylinder and a wheel brake cylinder of a vehicle, for modulating a brake pressure when there is a sensor-detected danger of locking the wheels of a vehicle, one plunger system required for each driver wheel. In German Auslegeschrift No. 22 12 912, an anti-lock or anti-skid system for motor vehicles is shown that has a brake force reducing means inserted into the brake line leading to the rear axle. This brake force reducer has a flow monitored by a valve and controlled by a rod, and it has a reducing plunger that under the influence of fluid pressure closes off this flow. Closing off the flow takes place whenever one wheel of the rear axle is locking or skidding. To this end, a pressure exchange chamber is put under pressure, and the reducing plunger closes the valve.

Although effective skid protection can be attained with this system, nevertheless it has no effect when wheels are spinning, when a drive slip regulating means must be operative.

OBJECT AND SUMMARY OF THE INVENTION

The plunger system according to the invention has the advantage over the prior art that it responds not only to the danger of wheel locking, but also to wheel spinning. This means that with this plunger system according to the invention, not only anti-skid control but anti-drive-slip control, as well, are attained.

In accordance with the invention, the particular kind of control effected, that is, anti-skid and anti-drive-slip control, depends on the axial motion of the plunger. In a very simple but extremely effective manner, this plunger takes on both functions.

In the normal situation, the plunger assumes a middle position, in which the axial bore is not closed. This means that in a normal braking event, brake fluid flows from the master brake cylinder through the brake line, one pressure chamber, an axial bore, and another pressure chamber to reach the wheel brake cylinder.

Valve elements are provided for closing the axial bore off from the pressure chambers. The axial bore merges on both sides, toward the pressure chambers, with valve bores, forming a shoulder-like step. In this vicinity, the rod tapers, forming one shoulder each, to form so-called rod end parts, which are each occupied by a respective spring-supported valve cone pointing in opposite directions from one another. With their conical tips, these valve cones meet the rod shoulders and thereby attain a defined end position. This defined end position is arranged such that when the plunger is in its middle position the valve cones can seat on their valve seat, and thus the unhindered flow of brake fluid from the master brake cylinder to the wheel brake cylinder is assured.

Now if wheel locking, or skidding, for instance, is detected, then a displacement of the plunger takes place in the direction of the valve cone of the pressure chamber toward the master brake cylinder. This closes off the axial bore, and at the same time fluid is pressed back out of the pressure chamber for the master brake cylinder. The opposite pressure chamber for the wheel brake cylinder increases in volume, causing brake fluid to be drawn from the wheel brake cylinder, relieving it.

If the plunger is displaced in the opposite direction, then a brake pressure is generated in the pressure chamber for the wheel brake cylinder, independently of the actuation of the master brake cylinder, which prevents wheel spinning.

The axial displacement of the plunger in the desired direction, depending on whether wheel locking or wheel spinning has been detected, is effected via action upon two pressure chambers, which are separated by a middle portion of the plunger. These pressure chambers can be subjected in alternation to fluid pressure, depending on whether wheel locking or wheel spinning is detected. This action is controlled by a variable-position valve. The pressure fluid for these pressure chambers is itself drawn from a supply system, which is regulated by a control means that also performs the control of the variable-position valve based on signals of the wheel sensors.

Preferably, the middle part of the plunger should be braced in one pressure chamber against a compression spring. To this end, it is provided that a stop washer is mounted on the compression spring toward the middle part of the plunger, and this washer strikes a housing shoulder when the middle position is attained. Then whenever the same pressure prevails in the pressure chambers, the middle part of the plunger meets the stop shoulder and thereby assumes its desired middle position. To enable controlling of this plunger stroke, the plunger can be connected via a rod with a travel transducer, which emits a signal accordingly to the control means. For example, if the plunger does not reach its middle position, then it suffices for a pressure medium to be supplied to the associated pressure chamber via the control means until the plunger does reach its middle position.

The scope of the invention also encompasses a corresponding method, in which the plunger in the normal situation is moved into a middle position in which the axial bore between the pressure chambers for the master brake cylinder and for the wheel brake cylinder is open. In the event of wheel locking, however, the plunger is axially displaced in one direction, whereupon a closure of the axial bore takes place. In the event of spinning of the wheels, the plunger is axially displaced in the other direction, and once again the axial bore is closed and an independent brake pressure is generated.

Overall, the present plunger system according to the invention is very simple in structure and has few parts subject to wear.

The invention will be better understood and further objects and advantages thereof will become more apparent from the ensuing detailed description of a preferred embodiment taken in conjunction with the drawing.

BRIEF DESCRIPTION OF THE DRAWING

FIG. 1 shows a longitudial section through a plunger system, in a vehicle brake system not shown in further detail, for modulating the brake pressure in the event of locking and spinning of the wheels of the vehicle; and FIG. 2 is an enlarged view of a portion of FIG. 1 shown by a circle.

DESCRIPTION OF THE PREFERRED EMBODIMENT

The plunger system 1 according to the invention is incorporated in a brake line 2 between a master brake cylinder HBZ, not shown in further detail, and a wheel brake cylinder RBZ, also not shown in further detail. To this end, the plunger system 1 has a connection bore 3 in a cap 4 for the brake line 2, and the cap 4 closes off an open end of a cylindrical housing 5. An outlet bore 6 is provided in this housing 5 as a connection with the brake line 2 to the wheel brake cylinder RBZ. The cap 4 is secured to housing 5 via appropriate cylinder screws 7.

The connection bore 3 discharges into an aixal, cylindrical pressure chamber A in the cap 4, the chamber being engaged by a plunger part 8 of a plunger 9.

Within the housing, the plunger part 8 passes through a pressure chamber B defined by the housing 5, the inner end of the cap 4, and a middle plunger part 10 the cross section of which is enlarged in sleeve-like fashion. Toward the pressure chamber B, the middle plunger part 10 is undergirded by a stop washer 11, against which a compression spring 12 is braced on one end. On the other end, the compression spring 12 acts upon a spring plate 13 braced against the cap 4. The spring plate 13 surrounds the plunger part 8. In the end position, the stop washer 11 meets a shoulder 14 formed by the housing 5 and thus defines a middle position of the plunger 9.

On the housing side of the stop washer 11, the middle plunger part 10 and a housing restriction 32 define a further pressure chamber C, through which an end part 16 of the plunger, adjoining the middle part 10 of the plunger, passes. The end part 16 engages a cylindrical bore 17 in the housing bottom 18 and there forms a further pressure chamber D, from which the brake line 2 emerges via the outlet bore 6.

The plunger 9 has an axial bore 19, in which is placed a cylindrical rod 20 with enough play along its outer surface that a sufficient flow cross section for the brake fluid is available between the rod and the bore 19. Alternatively, the rod can also have linear notches, grooves, or the like along its length in which fuel may pass. On both ends of the plunger, in the vicinity of part 8 and the end part 16, the axial bore 19 merges with an enlarged valve bore 21 and 22, respectively, in both locations forming a shoulder-like step 23, which embodies a valve seat for valve cones 24 and 25, respectively on opposite ends of the rod 20. Toward the valve cones 24 and 25, the rod 20 has reduced diameter end parts 27 that forms shoulders 26, on which the valve cones 24 and 25 can be supported. The valve cones 24 and 25 are guided with little play on rod end parts 27, which are tapered by comparison with the rod 20, and are subject to the action of compression springs 28 shown by light lines.

A connection plate 29 is attached to the housing 5 and secured firmly on the connection plate is a variable-position valve 30 indicated by broken lines. Via this variable-position valve 30, either the pressure chamber B, via an inlet 31, or the pressure chamber C, via a connecting bore 32, can be subjected to a pressure medium. An electrical energy supply system, shown in block form, is operative relative to signals from wheel sensors, not shown, to direct an output signal to the travel valve 30 for control of fluid to and from chambers B and C.

A bleeder valve is provided for the pressure chamber D at 33.

Also firmly resting in the middle part 10 of the plunger is a rod 34, which leads to the outside through the housing bottom 18. A clamp element 35 is fastened on the rod 34, serving to drive a travel transducer, not shown in further detail, for detecting the plunger stroke. For guiding the rod 34, a sheath 36 and a wiper ring 37 are disposed in the housing bottom 18.

The plunger system 1 functions as follows:

In the normal situation, that is, whenever equal pressure prevails in the pressure chambers B and C, the plunger 9 is retained in the middle position by the compression spring 12, and the stop washer 11 rests on the shoulder 14 of the housing 5 and the spring plate 13 rests on the end face of the pressure chamber B that is remote from the shoulder 14. In this position, shown in the drawing, neither valve cone 24 or 25 can assume a valve seat, because under the pressure of their respective compression spring 28 they are braced against the shoulders of the rod 20 but do not rest on the shoulder-like step 23 between the axial bore 19 and the respective enlarged valve bore 21 and 22. As a result, normal communication is established between the master brake cylinder HBZ and the wheel brake cylinder RBZ. In normal braking, the brake pressure is then propagated via the chamber A, the annular gap between the plunger 9 and the rod 20, and the chamber D to the wheel brake cylinder RBZ. The process for reducing the brake pressure again is equivalent.

If a sensor, not shown in detail, on the wheel indicates locking of the wheels during braking, then via an energy supply system (not shown), the chamber C is subjected to a pressure medium via the connecting bore 32. The plunger 9 thereupon moved toward the left, counter to the pressure of the compression spring 12, so that the valve cone 24 assumes its valve seat and the connection between the pressure chamber A and the pressure chamber D is closed. At the same time, brake fluid is positively displaced out of the pressure chamber A to the master brake cylinder HBZ due to movement of plunger 9 to the left. Also at the same time, the pressure chamber D is expanded, so that a pressure reduction takes place in the wheel brake cylinder RBZ. If the pressure chamber B is now filled with a pressure medium via the inlet 31 the plunger 9 moves to the right and to its neutral position, then the brake pressure in the brake line 2 to the wheel brake cylinder RBA increases once again. By a controlled imposition of pressure on the pressure chambers B and C, the brake pressure at the wheel brake cylinder RBZ can thus be modulated in a known manner. The disposition of the check valves additionally allows a brake pressure reduction in the wheel brake cylinder RBZ whenever the driver reduces the brake pressure.

If the sensor at the driven wheels should indicate the instance of drive slip regulation, then the pressure chamber B is subjected to pressure medium, which flows past the stop washer 11, driving the plunger 9 to the right. After a short stroke, the plunger 9 rests with its shoulder-like step 23 on the valve cone 25, so that once again the communication from the pressure chamber A to the pressure chamber D is closed. Upon further travel of the plunger 9, the volume of the pressure chamber D is reduced and a brake pressure is generated that slows down the spinning of the driven wheels.

The travel valve 30 and the supply system, not shown, for supplying the pressure chambers B and C with pressure medium are controlled by a control means of a known type. This control means also detects the plunger stroke, via the rod 34, so that especially in the normal situation the exact middle position of the plunger can be adhered to, without inadvertently closing one of the check valves.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A plunger system in a brake line between a master brake cylinder and a wheel brake cylinder of a vehicle for modulating a brake pressure in the event of any danger, detected by a sensor, of locking or spinning of wheels of the vehicle which comprises, a housing, a blind bore in said housing, an end closure for said housing, a plunger axially displaceable in said blind bore, a first variable pressure chamber formed by an end of said plunger and said end closure and a second variable pressure chamber formed between an end of said plunger and said housing, said first variable pressure chamber having a connection with a master brake cylinder and said second variable pressure chamber having a connection with a wheel brake cylinder, an axial bore in said plunger, a rod fixedly secured within said axial bore between said housing end of said blind bore and said end enclosure, said rod having a diameter which is less than said axial bore and means for closing one end of said axial bore in the event of a danger of wheel locking, as well as in the event of impermissible drive slip whereby fluid flow from said master brake cylinder to said wheel brake cylinder is blocked.

2. A plunger system as defined by claim 1, in which said axial bore (19) is closable due to an axial motion of said plunger (9).

3. A plunger system as defined by claim 1, in which said axial bore includes end portions (21, 22) of greater inside diameter which form valve seats at axial bore shoulder (23) on each end of said axial bore, said rod (20) includes smaller diameter end portions on each end (27) which form at each end a respective rod shoulder (26), a spring-supported valve cone on each end of said rod, each said valve cone having conical tips surrounding said smaller diameter end portions of said rod which conical tips point in opposite directions and which seat on said rod shoulders (26).

4. A plunger system as defined by claim 2, in which said axial bore includes end portions (21, 22) of greater inside diameter which form valve seats at axial bore shoulder (23) on each end of said axial bore, said rod (20) includes smaller diameter end portions on each end (27) which forms at each end a respective rod shoulder (26), a spring-supported valve cone on each end of said rod, each said valve cone having conical tips surrounding said smaller diameter end portions of said rod which conical tips point in opposite directions and which seat on said rod shoulders (26).

5. A plunger system as defined by claim 3, in which in a normal situation, said plunger (9) assumes a middle position, in which each valve cones (24, 25) seats on a respective rod shoulder (26), with a fluid-free passage between said valve seats on said axial bore shoulder (23) and said conical tips of said valve cone.

6. A plunger system as defined by claim 4, in which in a normal situation, said plunger (9) assumes a middle position, in which each valve cones (24, 25) seats on a respective rod shoulder (26), with a fluid-free passage between said valve seats on said axial bore shoulder (23) and said conical tips of said valve cone.

7. A plunger system as defined by claim 2, in which said plunger (9) includes a greater diameter intermediate portion which with a portion of said housing form two pressure chambers (B and C), a travel valve (30) secured to said housing which may direct fluid under pressure via inlets (31) or (32) optionally into pressure chambers (B and C), said travel valve (30) being controlled by an energy supply system via signals from a wheel sensor, whereby said plunger is axially displaceable thereby controlling fluid to and from said wheel brake cylinder.

8. A plunger system as defined by claim 3, in which said plunger (9) includes a greater diameter intermediate portion which with a portion of said housing form two pressure chambers (B and C), a travel valve (30) secured to said housing which may direct fluid under pressure via inlets (31) or (32) optionally into pressure chambers (B and C), said travel valve (30) being controlled by an energy supply system via signals from a wheel sensor, whereby said plunger is axially displaceable thereby controlling fluid to and from said wheel brake cylinder.

9. A plunger system as defined by claim 4, in which said plunger (9) includes a greater diameter intermediate portion which with a portion of said housing form two pressure chambers (B and C), a travel valve (30) secured to said housing which may direct fluid under pressure via inlets (31) or (32) optionally into pressure chambers (B and C), said travel valve (30) being controlled by an energy supply system via signals from a wheel sensor, whereby said plunger is axially displaceable thereby controlling fluid to and from said wheel brake cylinder.

10. A plunger system as defined by claim 5, in which said plunger (9) includes a greater diameter intermediate portion which with a portion of said housing form two pressure chambers (B and C), a travel valve (30) secured to said housing which may direct fluid under pressure via inlets (31) or (32) optionally into pressure chambers (B and C), said travel valve (30) being controlled by an energy supply system via signals from a wheel sensor, whereby said plunger is axially displaceable thereby controlling fluid to and from said wheel brake cylinder.

11. A plunger system as defined by claim 6, in which said plunger (9) includes a greater diameter intermediate portion which with a portion of said housing form two pressure chambers (B and C), a travel valve (30) secured to said housing which may direct fluid under pressure via inlets (31) or (32) optionally into pressure chambers (B and C), said travel valve (30) being controlled by an energy supply system via signals from a wheel sensor, whereby said plunger is axially displaceable thereby controlling fluid to and from said wheel brake cylinder.

12. A plunger system as defined by claim 7, in which said middle portion (10) of said plunger when in a neutral position seats against a compression spring loaded stop washer (11) in chamber (B) in which said stop washer seats on a shoulder of said housing.

13. A plunger system as defined by claim 8, in which said middle portion (10) of said plunger when in a neutral position seats against a compression spring loaded stop washer (11) in chamber (B) in which said stop washer seats on a shoulder of said housing.

14. A plunger system as defined by claim 9, in which said middle portion (10) of said plunger when in a neutral position seats against a compression spring loaded stop washer (11) in chamber (B) in which said stop washer seats on a shoulder of said housing.

15. A plunger system as defined by claim 10, in which said middle portion (10) of said plunger when in a neutral position seats against a compression spring loaded stop washer (11) in chamber (B) in which said stop washer seats on a shoulder of said housing.

16. A plunger system as defined by claim 11, in which said middle portion (10) of said plunger when in a neutral position seats against a compression spring loaded stop washer (11) in chamber (B) in which said stop washer seats on a shoulder of said housing.

17. A plunger system as defined by claim 1, which includes a rod (34) connected to a travel transducer for detecting a position of said plunger within said housing.

18. A plunger system as defined by claim 2, which includes a rod (34) connected to a travel transducer for detecting a position of said plunger within said housing.

19. A plunger system as defined by claim 3, which includes a rod (34) connected to a travel transducer for detecting a position of said plunger within said housing.

20. A plunger system as defined by claim 5, which includes a rod (34) connected to a travel transducer for detecting a position of said plunger within said housing.

21. A plunger system as defined by claim 7, which includes a rod (34) connected to a travel transducer for detecting a position of said plunger within said housing.

22. A method for modulating the brake pressure from a master brake cylinder to a wheel brake cylinder in an event of danger which comprises detecting a rotation condition of the wheels of a vehicle via a sensor, directing a signal from said sensor to a travel valve fluid pressure control means, applying fluid under pressure to one side of an intermediate portion of a plunger to move said plunger in a desired direction to prevent fluid flow from the master brake cylinder to the wheel cylinder to prevent spinning and wheel lock, and displacing said plunger axially in one direction during locking of the wheels, and displacing said plunger in an opposite direction during spinning of the wheels to prevent fluid flow from said master brake cylinder to said wheel brake cylinder.

23. A method as defined by claim 22, in which an axial displacement of said plunger is effected by means of alternative imposition of pressure fluid on pressure chambers on opposite sides of the intermediate portion of the plunger.

* * * * *